(12) United States Patent
Moxon

(10) Patent No.: US 12,275,535 B2
(45) Date of Patent: Apr. 15, 2025

(54) CRYOGENIC FUELED AIRCRAFT

(71) Applicant: ROLLS-ROYCE plc, London (GB)

(72) Inventor: Matthew Moxon, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 18/602,091

(22) Filed: Mar. 12, 2024

(65) Prior Publication Data

US 2024/0327021 A1     Oct. 3, 2024

(30) Foreign Application Priority Data

Mar. 31, 2023    (GB) ........................ 2304849

(51) Int. Cl.
*B64D 37/30*     (2006.01)
*B64D 37/04*     (2006.01)
*B64D 37/10*     (2006.01)

(52) U.S. Cl.
CPC ............ *B64D 37/30* (2013.01); *B64D 37/04* (2013.01); *B64D 37/10* (2013.01)

(58) Field of Classification Search
CPC ................................ B64D 37/04; B64D 37/30
See application file for complete search history.

(56) References Cited

U.S. PATENT DOCUMENTS

| | | | |
|---|---|---|---|
| 2,541,371 A | 2/1951 | Kops | |
| 7,322,546 B2 | 1/2008 | Snow, Jr. et al. | |
| 7,806,365 B2 * | 10/2010 | Miller | B64U 10/25 244/135 R |
| 2008/0006743 A1 | 1/2008 | Miller et al. | |
| 2013/0306797 A1 * | 11/2013 | Dalle Donne | B64D 37/12 244/135 R |
| 2016/0311553 A1 | 10/2016 | Alber et al. | |
| 2021/0078702 A1 | 3/2021 | Ciet et al. | |
| 2021/0381429 A1 * | 12/2021 | Taylor | F02K 3/06 |
| 2022/0227497 A1 | 7/2022 | Dean | |

FOREIGN PATENT DOCUMENTS

| | | |
|---|---|---|
| CN | 217598846 U | 10/2022 |
| DE | 102021107184 B3 * | 9/2022 |
| FR | 3 100 798 A1 | 3/2021 |
| GB | 129359 A | 7/1919 |
| GB | 577368 A | 5/1946 |
| GB | 2 591 255 A | 7/2021 |
| GB | 2 602 936 A | 7/2022 |
| JP | 4911908 B2 | 4/2012 |

(Continued)

OTHER PUBLICATIONS

Sep. 28, 2023 combined Search and Examination Report issued in British Patent Application No. 2304849.9.

(Continued)

*Primary Examiner* — Philip J Bonzell
*Assistant Examiner* — Eric Acosta
(74) *Attorney, Agent, or Firm* — Oliff PLC

(57) ABSTRACT

An aircraft includes a fuselage and a wing, at least one hydrogen fuel tank and a fuel line configured to delivery fuel from the fuel tank to the engine. The fuel tank is installed externally of the fuselage and wing, and comprises an external aeroshell containing a plurality of pressure vessels configured to contain pressurised fuel therein.

14 Claims, 4 Drawing Sheets

(56) References Cited

FOREIGN PATENT DOCUMENTS

RU        2 099 248 C1    12/1997
RU        2 102 279 C1    1/1998

OTHER PUBLICATIONS

Jul. 8, 2024 extended Search Report issued in European Patent Application No. 24163127.4.
Khandelwal, B et al., "Hydrogen powered aircraft: The future of air transport," Progress in Aerospace Sciences, vol. 60, pp. 45-59, 2013.
Sep. 8, 2023 combined Search and Examination Report issued in British Patent Application No. 2304850.7.
Jul. 8, 2024 extended Search Report issued in European Patent Application No. 24163128.2.
Sep. 25, 2023 combined Search and Examination Report issued in British Patent Application No. 2304848.1.
Jul. 26, 2024 extended Search Report issued in European Patent Application No. 24163125.8.
U.S. Appl. No. 18/602,098, filed Mar. 12, 2024 in the name of Matthew Moxon.
U.S. Appl. No. 18/602,086, filed Mar. 12, 2024 in the name of Matthew Moxon.

* cited by examiner

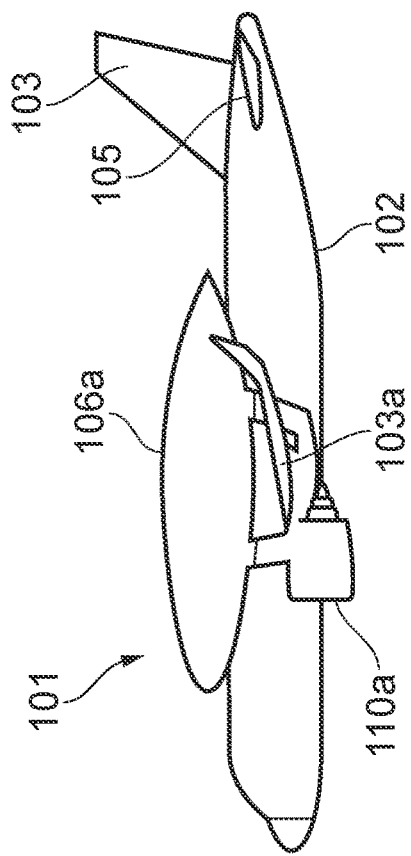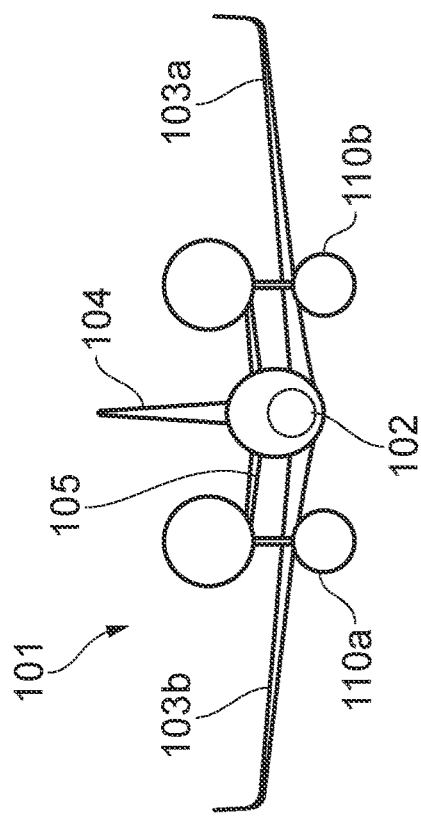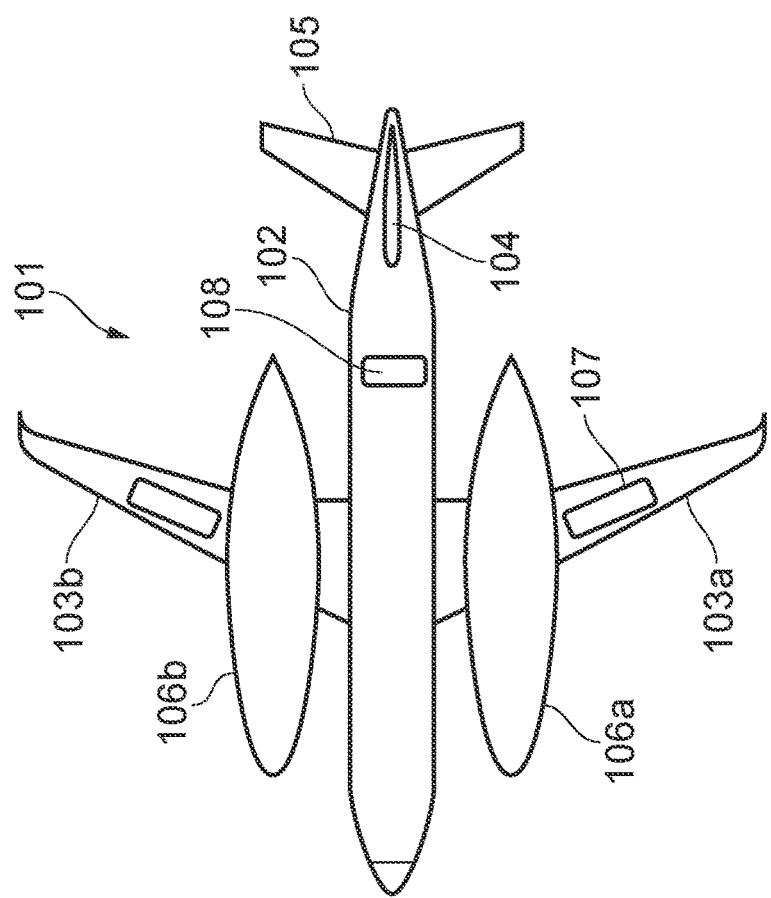

CRYOGENIC FUELED AIRCRAFT

TECHNICAL FIELD

This disclosure relates to an aircraft.

BACKGROUND

In order to limit emissions of carbon dioxide, use of hydrogen as an alternative to hydrocarbon fuel in gas turbine engines has historically only been practical in land-based installations. Similarly, cryogenic methane has also been studied. In order to provide the necessary fuel energy density to provide adequate range, cryogenic liquid and/or supercritical hydrogen and methane fuelled airliners have recently been proposed. In view of the still relatively low density of liquid and supercritical hydrogen and methane, storage of the necessary quantity of fuel to enable the required range is difficult. There are also safety concerns with regard to passenger aircraft, in view of the high flammability of hydrogen and methane, and cryogenic temperatures of the fuel.

SUMMARY

The present invention relates to an aircraft as defined in the claims.

BRIEF DESCRIPTION OF THE DRAWINGS

Embodiments will now be described by way of example only with reference to the accompanying drawings, which are purely schematic and not to scale, and in which:

FIG. 1a shows a plan view of a first cryogenic-fuelled airliner comprising hydrogen-fuelled turbofan engines;

FIG. 1b is a side view of the airliner of FIG. 1a;

FIG. 1c is a front view of the airliner of FIG. 1a;

FIG. 4b is a side view of the airliner of FIG. 4a;

FIG. 4c is a front view of the airliner of FIG. 4a.

DETAILED DESCRIPTION

Figure 2:
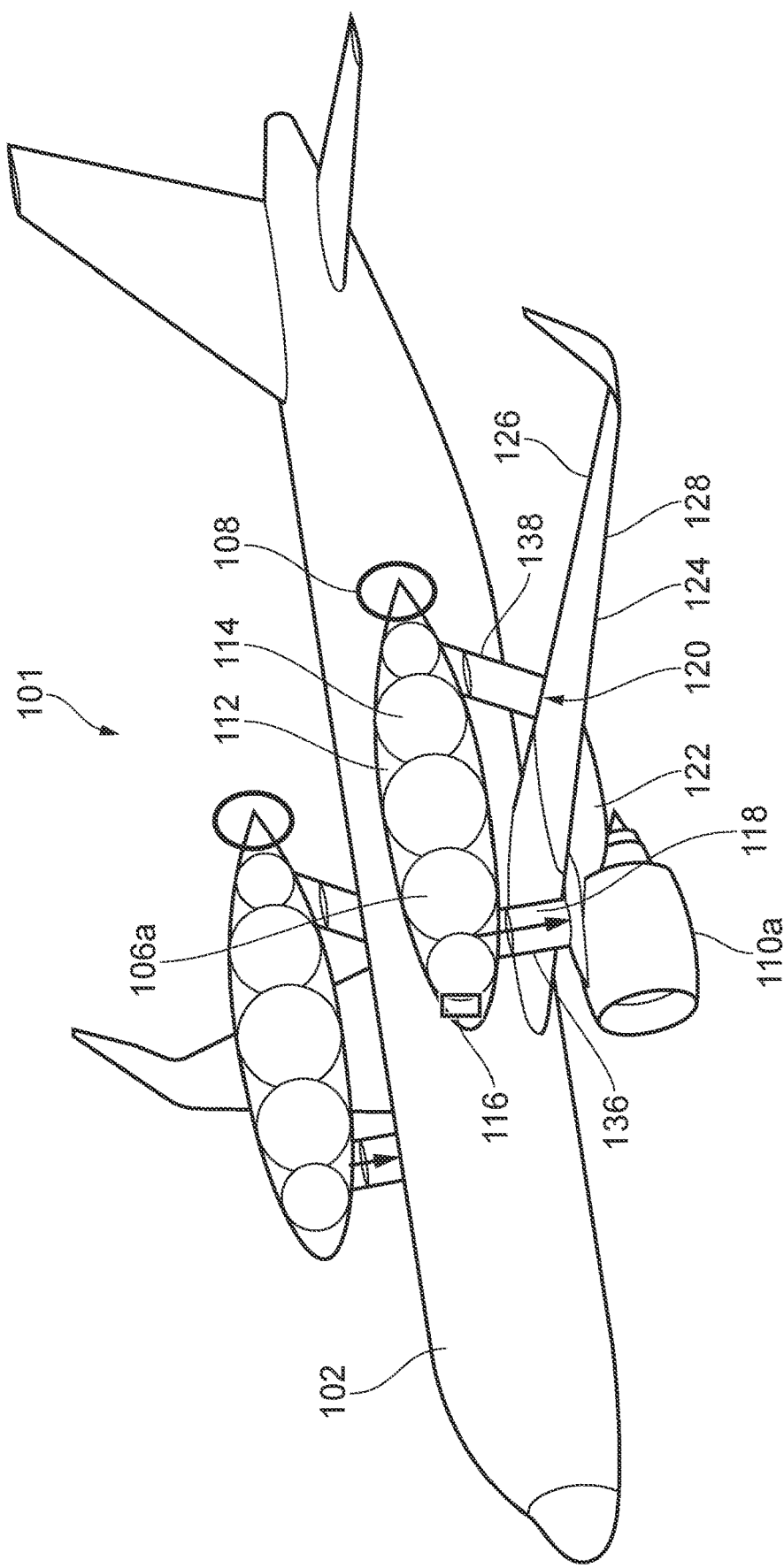
FIG. 2 is an isometric front view from above of the aircraft of FIG. 1a showing internal structure of the fuel tanks.

An at least partly cryogenic-fuelled airliner is illustrated in FIG. 1. In this example, the airliner 101 is of substantially conventional tube-and-wing twinjet configuration with a central fuselage 102, wings 103a, 103b and substantially identical first and second underwing-mounted hydrogen fuelled turbofan engines 110a, 110b. The wings 103a, 103b are mounted relatively low on the fuselage sides, in a "low" or "mid" wing configuration, with the engine spar passing underneath a passenger cabin of the aircraft. An empennage is provided at an aft end of the aircraft and comprises vertical and horizontal tail surfaces 104, 105.

First and second cryogenic storage tanks 106a, 106b are installed spaced from a respective upper wing surface. The term "cryogenic liquid fuel" will be understood to refer to fuel stored as a liquid at low temperatures, whereby the fuel would be in a gaseous phase when at standard atmospheric temperature and pressure. In the present embodiment, the tanks are configured to store cryogenic liquid hydrogen. However, in other embodiments, the fuel may comprise cryogenic methane, stored as either a liquid or a compressed, chilled gas. Each hydrogen storage tank 104 is a cryogenic hydrogen storage tank and thus stores the hydrogen fuel in either a liquid state or a cooled, supercritical state.

FIG. 2 shows the internal arrangement of the tanks 106a, 106b in more detail. As can be seen, each tank 106a, 106b comprises an outer aeroshell 112 which contains a plurality (five in the embodiment show) of substantially spherical pressurised hydrogen containers 114.

The outer aeroshell 112 is arranged to provide a common mounting point for the hydrogen containers 114, and to provide an aerodynamic profile to minimise drag. The aeroshell 112 is wetted by the external airstream, i.e. is in contact with ambient airflow in use. However, the aeroshell is not wetted by the fuel, i.e. the aeroshell does not provide a pressure vessel for the fuel in itself. The aerodynamic profile is optimised for the typical cruising speed of the aircraft 101, and is typically of tear-drop shape. In the embodiment shown, the aeroshell has a circular cross-section about a longitudinal axis, and tapers from points at each end to a maximum thickness at an approximately central region. The aeroshell 112 may have an NACA section thickness distribution, which may be modified in thickness or camber in order to generate lift in flight, and/or to minimise installed drag in the presence of the wing 103a, 103b. For example, the tank may be designed employing the "Whitcomb Area Rule", in which the total cross-sectional area of the aircraft is maintained as close as possible to the ideal Sears-Hack profile. For example, the tank may be positioned and/or profiled to take area ruling into account by, for example, "waisting" of the tank in areas where the aircraft cross-section exceeds the Sears-Hack profile, or increasing the area of the tank in areas where the aircraft cross-section is below the ideal profile. Additionally, area forward and aft of the wing planform may act as anti-shock bodies. Typically, the longitudinal axis of the aeroshells is approximately aligned to the longitudinal axis of the aircraft 101, though it may in some cases be canted to generate lift.

For a particular aircraft, the aeroshell 112 is designed as a volume of revolution produced from inverse design methods to achieve a desired pressure distribution. Suitable direct-inverse design methods are described for example in "Development of direct-inverse 3-D methods for applied aerodynamic design and analysis", published by NASA on 1 Feb. 1998 as document ID 19880006385, NASA report number CR-182436. In general, such design methods prescribe a pressure distribution on the body, and then iteratively solve the flow questions to find the geometry which produces this pressure distribution Further methods for drag reduction may include cambering the tank to match the local streamline curvature around the wing. This will help reduce local restrictions, which could otherwise locally accelerate airflow, and may generate shocks at high subsonic speeds. In general, a design objective is to have the isobars and shocks sweep with the wing to reduce wave drag. Additional aerodynamic features may also be employed as will be understood by the skilled person, for example to control flow separation and high angles of attack and/or low speeds. Examples of such features include strakes, turbulators, etc. Aerodynamic features to improve aerodynamic stability may also be provided, such as moving control surfaces or fins.

Conveniently, the aeroshell 112 comprises one or more access panels to provide access to the containers 114 during maintenance. Where the aeroshell is not provided with a vacuum, an inert gas may be provided within the aeroshell to ensure that any hydrogen leaks do not result in a combustible mixture. Alternatively, a flow of air may be provided to ensure the volume is purged such that the hydrogen concentration does not exceed flammability limits. Such a system may be passive, comprising vents, or active, comprising fans. These access panels may be constructed as pressure relief/blow-out panels to manage failure cases, such as overpressure or combustion events.

Each aeroshell optionally includes a Boundary Layer Ingesting (BLI) propulsor 108. Each propulsor 108 is provided at an aft portion of the respective tank 106a, 106b, and is configured to ingest part or all of a boundary layer of air surrounding the tank 106a, 106 in flight. The propulsor 108 may be of any suitable type, and could for example comprise either an open or shrouded rotor. Typically, the propulsor 108 is driven by an electric motor (not shown), though other propulsion means may be employed. In one embodiment, the BLI propulsor is powered passively by a rotor comprising an outer portion which acts as a turbine, driven by air flowing past the rotor during operation, and an inner portion which drives the boundary layer. Such an arrangement is described in the applicant's previous U.S. Pat. No. 1,078, 720. The presently described aircraft design is particularly suited to a BLI thruster compared to a conventional design in which the BLI thruster would be located at the tail of the aircraft. Such designs may be susceptible to tail strikes damaging the thruster. Additionally, the boundary layer at the tail may have varying thickness/varying velocities in view of the complex shape of the fuselage and the presence of the wings upstream of the BLI thruster. In contrast, in the present design, the BLI thrusters are located on an aft portion of the fuel tank, which is itself provided in relatively clean air, with no other aircraft features provided upstream. Additionally, the tank is relatively symmetrical. As such, a consistent boundary layer is formed having a relatively uniform boundary layer relatively free of turbulence. As such, the BLI thruster may have high effectiveness. Additionally, modifications to existing airframes can be expected to generally increase wetted area, and so skin friction drag. The addition of a BLI thruster can greatly reduce this skin friction drag, and so reduce the overall penalty of the modifications.

Each hydrogen container 114 is provided within the aeroshell 112, and is typically spaced from the aeroshell by insulating material (not shown) such as foam insulation or Multi-Layer Insulation (MLI). In other cases, the aeroshell or parts thereof could be evacuated to form a vacuum therein, to prevent heat transfer to the containers 114. Typically, the containers 114 are mounted to the aeroshell 112 by wires, to minimise heat conduction, or may be supported by the insulating material. In contrast to the aeroshell 112, the hydrogen container 114 is configured to provide pressure containment and insulation for the hydrogen fuel, but is not in contact with the external airflow.

Each hydrogen container 114 is generally spherical, and may contain further insulating material therein. By providing separate spherical containers within an aeroshell, the containers 114 can be shaped for the most efficient storage of hydrogen, while the aeroshell can be shaped for the most efficient aerodynamic performance (drag and/or lift). It will be understood that other shapes may be preferred. For example, the containers 114 may be generally toroidal.

The hydrogen containers 114 are typically dissimilar, with the forwardmost container having a smaller diameter than those in the central portion of the aeroshell 112, with the diameter of the containers 114 again reducing towards the aft portion of the aeroshell, i.e. generally following the profile of the aeroshell. This provides for the most efficient use of the internal volume of the aeroshell, whilst maintaining a generally spherical shape of the containers for good gravimetric efficiency.

It has been found by the inventor that, for a typical aircraft, the resulting design results in a hydrogen storage system which has lower drag and/or lower empty weight for a given storage volume than one in which the pressurised container acts as both the hydrogen container and an aerodynamic shell. The design compromises necessary to produce such a combined aerodynamic/volumetrically efficient shape inevitably result in compromises which can be overcome by the arrangement of the present disclosure.

Additional advantages of the disclosed arrangement are also envisaged. The provision of separate containers provided within the aeroshell adjacent the wing effectively provides a baffled tank, which prevents hydrogen from sloshing within the tank 106a, 106b in use. Consequently, aircraft stability is improved. Furthermore, redundancy is provided, since a leak from one container 114 would not result in all of the fuel from that tank 106a, 106b being depleted. Finally, damage to the external aeroshell may be easier and cheaper to repair, as individual panels can be replaced, and the pressure vessel does not have to be retested.

Modifications to the basic design shown in FIG. 2 are envisaged. For example, the containers 114 may be part-spherical, wherein the notional spheres overlap with one another, or toroidal. Such an arrangement may permit for more efficient use of the space within the aeroshell 112. Other arrangements fo the containers 114 within the aeroshell could also be envisaged. For example, "keep-out" zones could be defined, in which no tanks are provided. In one example, the plane of the turbine and compressor disks may represent a keep-out zone, with containers 114 being provided outside of this plane.

Typically, the containers 114 are in fluid communication with one another through one or more conduits (not shown), which permits a single passage 118 to be used to supply the engines with fuel from each tank 106a, 106b. For example, each container 114 may comprise a conduit which communicates with a common manifold, or posts may be provided in the containers 114 to provide direct communication between the containers 114. Similarly, this may permit single-point refuelling for the tank 106a, 106b through a refuelling port (not shown) provided at the aft of the aeroshell for example, or on the aft strut supporting the aeroshell. Additionally, one or more emergency fuel dump valves may be provided, which may for example be provided at an aft portion of the tanks 106a, 106b to avoid impingement of fuel onto the aircraft. The connection between the tanks is typically controllable, for example using valves, to prevent the whole tank from being drained in the event of damage to one of the pressure vessels. Operationally, there may be an optimum sequence of tank draining in order to produce minimum aircraft (trim) drag and boil-off of hydrogen for any given flight.

Likewise, it is likely that there will be an optimum filling sequence. If it is necessary or desirable to fly the aircraft with less than full fuel capacity, it may be preferable to achieve this by completely filling some tanks and leaving others empty (though it is likely to always be desirable to fill at least two tanks on each side for redundancy). As such, while a single external connection port may be provided, this may be connected to a manifold feeding individual fuel lines to each tank, controlled by respective valves (not shown). As can be seen from FIG. 2, the provision of spherical pressurised containers 114 within the aeroshell 112 leaves some empty space within the aeroshell 112 between the containers 114 and an internal wall of the aeroshell 112. This empty space may be employed for the location of auxiliary equipment, such as fuel pumps, hydrogen heaters etc within an equipment bay 116. For example, it may be desirable to provide the aeroshell 112 with a de-icing system such as e.g. but not limited to electrical heating, bleed air, or liquid de-icing fluid, to prevent ice accumulation on the external surface of the aeroshell 112. The equipment bay 116 may house some of this de-icing equipment.

Each tank 106a, 106b is installed above a respective wing 103a, 103b. In view of the relatively large size of the tanks 106a, 106b, significant drag is generated, in particular, careful design may be required to reduce interference drag from interaction of flow over the upper surface of the wings and the lower surface of the tanks. Drag may be particularly high in this region, since airflow is accelerated by both the tapered tanks 106a, 106b, and the cambered upper surface of the wings 103a, 103b.

In order to reduce this drag, each tank 106a, 106b is spaced significantly from the upper surface of each wing. Typically, the wings are spaced such that the boundary layers of the respective surfaces do not intersect, i.e. they are spaced further than the sum of the boundary layer thicknesses of the opposing surfaces. Additionally, each tank 106a, 106b is mounted to the upper surface such that no part of the tanks 106a, 106b or structural elements supporting the tanks is in contact with the upper surface. Such a design ensures that the structural integrity of the wings is unaffected by the provision of the pylons. As such, the tanks may be added to an existing aircraft design more readily. Finally, the tanks 106a, 106b are positioned in a vertical and span position on the wings such that a streamline passing through the boundary layer of the tank does not intersect with any downstream aerodynamic surface or structure during at least one phase of flight. For instance, the tank is positioned at a span position and/or a height such that the boundary layer does not intersect with either the horizontal or the vertical stabilizer during airborne flight, such as during at least cruise and climb conditions. It will be understood that there may be some impingement of the boundary layer on downstream surface during extreme edges of the flight envelope, for example during large cross-winds or high-alpha manoeuvres. Such an arrangement reduces turbulence and drag on the tail, thereby improving tail effectiveness and reducing drag. Additionally, in the event of a tank structural failure, any flames resulting from a fire would no impinge on other aircraft structures, particularly the tail.

FIGS. 1b and 2 in particular illustrate a mounting arrangement 120 for mounting a tank 106a, 106b to the wing 103a, 103b. Each mounting arrangement 120 mounts the tank 106a, 106b to the respective wing 103a, 103b via an engine pylon 122, which is in turn arranged to mount the respective engine 110a, 110b to the respective wing 103a, 103b.

Figure 3:
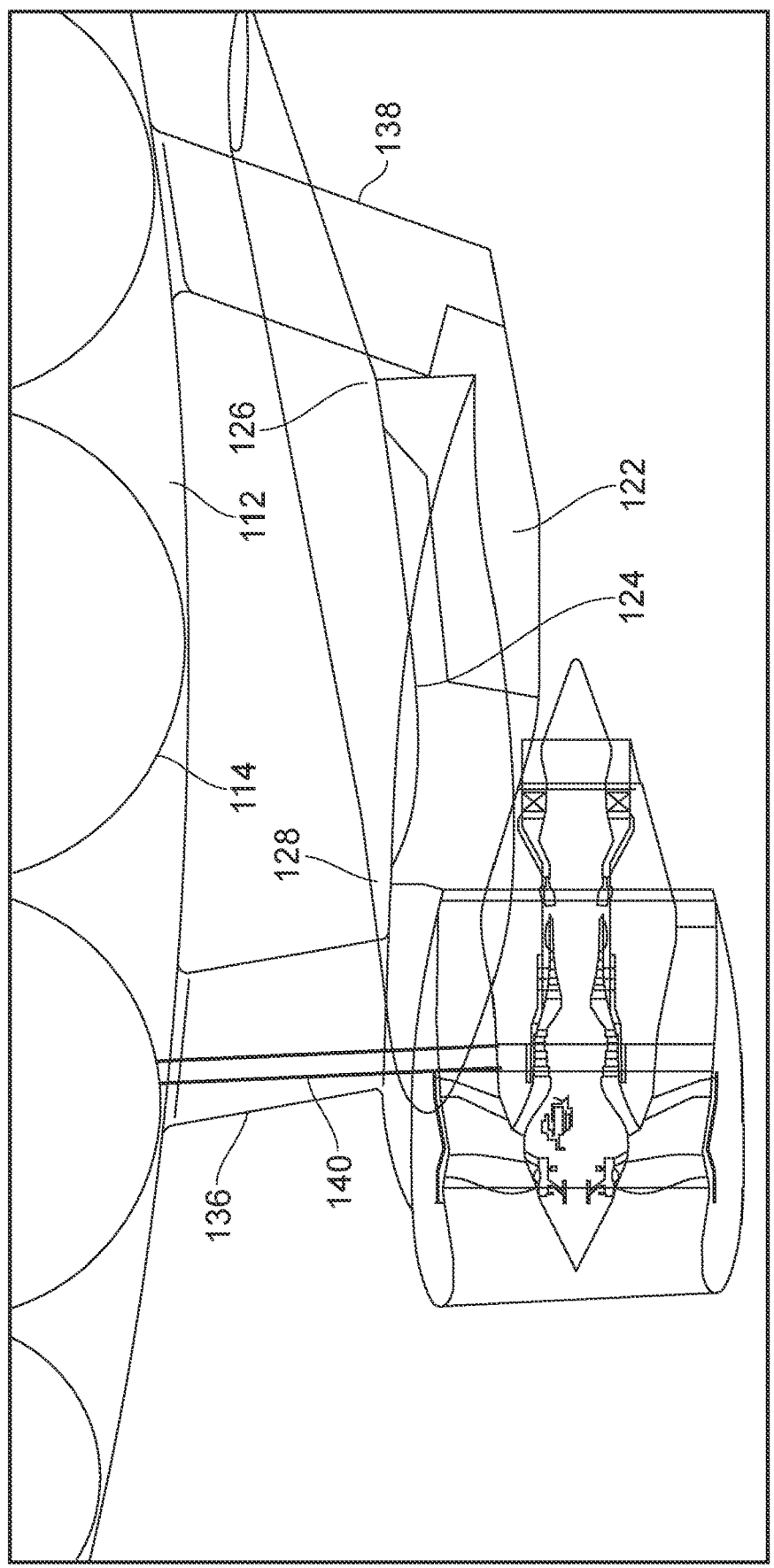
FIG. 3 is a side view through the structure of part of the aircraft of FIG. 1.

Referring now to FIGS. 2 and 3, the engine mounting 122 extends from a lower surface 124 of the respective wing 103a, 103b, and is typically attached to the wing via a or a plurality of wing spar(s) (not shown) which runs along a span of the wing. The engine pylon extends generally longitudinally fore and aft along a chord of the wing, from aft of a trailing edge 126 to forward of a leading edge 128 of the wing 103a, 103b.

The engine 110a, 110b is mounted to the engine pylon at a forward end of the pylon 122, such that a centre of mass of the engine 110a, 110b is provided forward of the wing leading edge 128. The engine 110a, 110b is attached to the pylon by front and rear support struts 132, 134.

Optionally, further additional struts (not shown) may be provided, for example laterally of the front and rear support struts 132, 134, to provide additional lateral stiffness of the mounting arrangement.

The tank 106a, 106b is in turn attached to the engine pylon by front and rear hydrogen tank support struts 136, 138, which extend between the hydrogen tank 106a, 106b and a respective engine pylon 122. The front strut 136 is coupled with the engine pylon 122 at a position forward of a leading edge 128 of the respective wing 103a, 103b, while the rear strut 138 is coupled with the engine pylon at a position aft of the trailing edge 126 of the wing. As such, each tank 106a, 106b is wholly spaced from the upper surface of the wing, while each strut is wholly spaced from both the trailing and leading edges 126, 128. Consequently, the design avoids placing struts and tanks at positions having high relative airflow velocity (in particular the wing upper surface and leading edge). The design also leaves the outer mould line of the wing unaffected, simplifying a retrofit. Additionally, by providing the fuel tanks above the wings, and above the engines the fuel lines can run substantially vertically from the tank to the engines. As a result, any bubbles in the fuel lines resulting from boiling of liquid cryogenic fuel will rise to the top of the fuel tank, where it can be retained in the ullage space in the fuel tank. As such, bubbles do not cause gas-locking of the fuel lines or cavitation within a downstream fuel pump.

The forward strut 136 is joined to the pylon at substantially the same longitudinal and lateral position as the forward engine mount 132.

Each strut 136, 138 is aerodynamically profiled, having a generally NACA or supercritical type profile extending in a generally vertical axis (similar to the vertical stabiliser 104. As such, each strut defines a span extending generally vertically, a chord extending generally longitudinally, and a thickness extending generally normal to the chord and span. The thickness-to-chord ratio is generally similar to that of the wing 103a, 103b, and is configured to enable a hydrogen supply conduit 140 to pass therethrough, to provide hydrogen from the tank 106a, 106b to a respective engine 110a, 110b. The chord is generally greater than the thickness, to accommodate flight loads in use, which will generally be longitudinal. Each strut may be angled somewhat, such that a leading edge of the respective strut 136, 138 is swept relative to local airflow in use. As such, transonic drag is minimised.

In view of the arrangement of the tank mounting struts, a "clean" upper surface of the wing is provided, with neither the tank nor the mounting arrangement contacting the aerodynamic outer surface of the upper wing, or the leading or trailing edges. As such, a high degree of aerodynamic efficiency is provided. Additionally, the wide spacing of the struts fore and aft of the wing provides for a strong, stiff, and yet light structure, while also reducing interference between the struts.

A further feature of the tank mounting arrangement is the provision of removable and/or exchangeable tanks. As will be appreciated, the tanks 106a, 106b are large, massive, and produce significant drag. It may be beneficial to provide a range of tanks having different sizes, which can be removed and replaced to provide for more range where required, without imposing an excessive drag penalty for shorter missions. Additionally, the tanks may have a relatively short design life in view of repeated thermal expansion and contraction, or future improvements in hydrogen tank technology, and thus can be replaced easily. To provide for this feature, quick disconnect fuel fittings are provided between the tank and mounting arrangement, with tank aeroshell being configured to be removed from the struts 136, 138. As such, the struts 136, 138 typically stay in place when the tanks are removed.

Each hydrogen tank 106a, 106b is configured to supply hydrogen fuel to a respective engine 110a, 110b only, preferably with no cross-flow between the two sides of the aircraft. In other embodiments, cross-flow conduits may be provided between the tanks or engines. Hydrogen is supplied to the respective engine via the respective fuel conduit 140, which passes directly from the respective tank 110a, 110b to the respective engine 110a, 110b via the forward strut 136. As such, no cryogenic fuel conduits are provided which extend through the fuselage 102, or through significant portions of the wing 103a, 103b. This has implications for both fuel system weight and safety. Additionally, no additional cryogenic tankage is provided within the fuselage 102. This ensures that any leaks do not penetrate into the passenger cabin.

Hydrogen fuel has a low density, and as such occupies a large volume for a given mass. Consequently, a given mass flow rate of gaseous hydrogen require a large conduit cross-section. Conversely, while liquid hydrogen has a higher density, this density is still relatively low. Furthermore, liquid hydrogen requires extensive insulation to maintain in a liquid state, and may result in ice forming on surface adjacent liquid hydrogen conduits. As such, it is desirable to minimise the length of hydrogen conduits provided in a hydrogen fuelled aircraft. The presently disclosed design achieves this objective by placing hydrogen tanks adjacent the engines, and providing direct flow between them.

Additional advantages are also provided by this arrangement. Since the tanks 106a, 106b are fully isolated, a leak in one tank will not spread to the other tank. Consequently, improved redundancy is provided. The provision of a plurality of hydrogen containers 114 in each tank 106a, 106b provides further redundancy.

As noted above, the disclosed hydrogen tank design can be incorporated as a retrofit to an existing aircraft. As such, existing fuel tanks, such as aircraft wing tanks 107 and fuselage 108 tanks may be retained. Such tanks are configured to store non-cryogenic liquid hydrocarbon fuel (such as aviation kerosene or biofuel), and exist as part of the pre-existing aircraft design. Consequently, the aircraft can be operated as a "dual fuel" aircraft, with the engines being supplied with one or a mixture of a cryogenic fuel stored in the overwing tanks 106a, 106b, and the wing and fuselage hydrocarbon tanks 107, 108 depending on requirements. Consequently, the aircraft can be operated or ferried between airfields at which hydrogen may not be available. Alternatively, the aircraft range can be extended using hydrocarbon fuel in the fuel tanks, while it can be operated as a hydrogen powered aircraft for shorter flights.

Figure 4B:
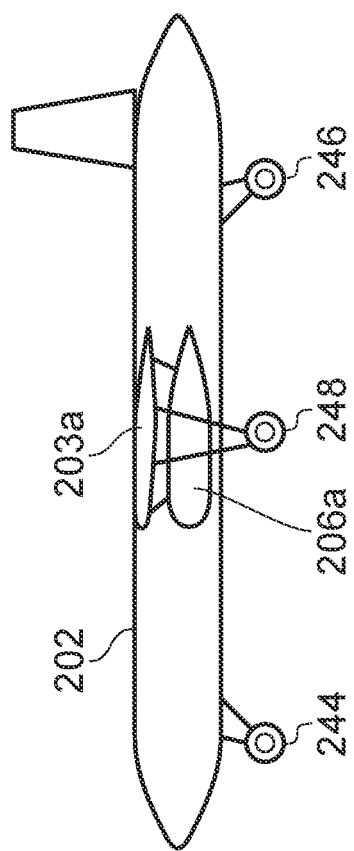
Figure 4C:
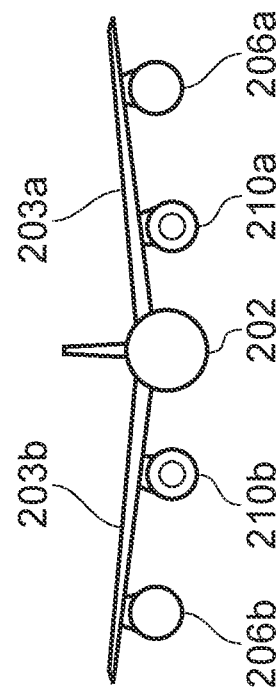
Figure 4A:
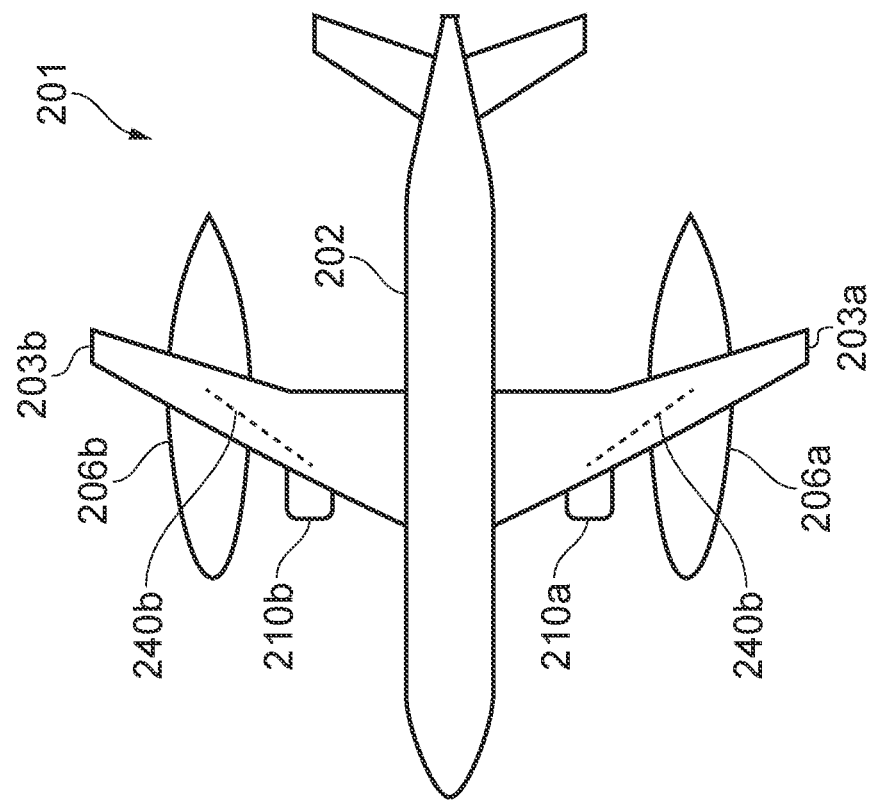
FIG. 4a is plan view of a second cryogenic-fuelled airliner comprising cryogenic-fuelled turbofan engines.

FIGS. 4a to 4c illustrate a further embodiment.

An aircraft 201 is shown, having a fuselage 202 and wings 203a, 203b. The wings 203a, 203b are mounted in a "shoulder" configuration relatively high on the fuselage, with the wing spar passing above the passenger cabin. Such an arrangement provides further room for equipment mounted below the wing, such as engines 210a, 210b and fuel tanks 206a, 206b.

The engines 210a, 20b are mounted in a similar manner to the embodiment shown in FIGS. 1 to 3, below mounted below the wings at a mid-span position by engine pylons. The fuel tanks 106a, 106b are also mounted below the wings 203a, 203b by a separate mounting arrangement comprising respective tank pylons 242a, 242b, at a span position further from the aircraft fuselage 202 than the engines 210a, 20b. Again, the hydrogen fuel tanks 106a, 106b are removable, and may be exchanged for tanks of different sizes for different missions. Hydrogen fuel conduits 240a, 240b are provided, which extend between respective tanks 106a, 106b and engines 110a, 110b. Again, each tank 106a, 106b supplies only the engine on the same wing, with no fuel tanks or conduits being provided within or crossing the fuselage 202.

In view of the high-mounted wing, the embodiment of FIGS. 3a to 3c enables the tanks 106a, 106b to be installed beneath the wing. Such an arrangement may be more convenient for the installation and removal of the tanks in operation.

FIG. 3b shows a landing gear configuration for the aircraft 201.

Since the high-mounted wing results in a wing which is far from the ground, the landing gear is of a bicycle configuration, with forward 244 and aft 246 wheels. Outriggers 248 are provided installed near the wing tips for stability. Advantageously, long conventional landing gear is avoided, which would result in high overall landing gear weight. Additionally, the weight of the wings having relatively heavy fully fuelled tanks located near the wing tips is supported when on the ground.

Various examples have been described, each of which comprise various combinations of features. It will be appreciated by those skilled in the art that, except where clearly mutually exclusive, any of the features may be employed separately or in combination with any other features and thus the disclosed subject-matter extends to and includes all such combinations and sub-combinations of the or more features described herein.

For example, other locations could be provided for the tanks. In one embodiment, the tanks could be installed in pods attached to an external surface of the fuselage, but not within the fuselage. As such, the tanks are close to the aircraft centre of gravity, which reduces the effect of empty or full tanks on aircraft trim. In alternative embodiments, the engines could be mounted above the wings.

The invention claimed is:

1. An aircraft comprising a fuselage and a wing, at least one fuel tank and a fuel line configured to deliver fuel from the fuel tank to an engine; wherein
    the at least one fuel tank is installed externally of the fuselage and wing and comprises an external aeroshell containing a plurality of pressure vessels configured to contain pressurised fuel therein,
    the at least one fuel tank is mounted above the wing, spaced from an upper surface of the wing, and
    a forward tank support strut extends between the at least one fuel tank and a first mounting point provided forward of the wing, and a rear tank support strut extends between the at least one fuel tank and a second mounting point provided aft of the wing.

2. The aircraft according to claim 1, wherein the at least one fuel tank is configured to store a cryogenic liquid or gaseous fuel such as hydrogen, methane or ammonia.

3. The aircraft according to claim 1, wherein each pressure vessel is substantially-spherical.

4. The aircraft according to claim 1, wherein two or more pressure vessels are interconnected to permit fuel to flow between the pressure vessels.

5. The aircraft according to claim 1, wherein insulation or a vacuum is provided between the pressure vessels and internal walls of the external aeroshell.

6. The aircraft according to claim 1, wherein the aircraft comprises
 a first engine, a first fuel tank and a first fuel line, each installed externally on a first wing, and
 a second engine, a second fuel tank and a second fuel line, each installed externally on a second wing,
 wherein neither the first fuel line nor the second fuel line passes through the fuselage.

7. The aircraft according to claim 1, wherein the fuel tank is removable from the aircraft.

8. The aircraft according to claim 1, wherein all aircraft fuel storage capacity is provided external to the fuselage.

9. The aircraft according to claim 1, wherein the engine is mounted below the wing by an engine pylon.

10. The aircraft according to claim 9, wherein the at least one fuel tank is mounted to the wing via the engine pylon.

11. The aircraft according to claim 1, wherein the at least one fuel tank is positioned such that a streamline passing through a boundary layer of the at least one fuel tank does not intersect with any downstream aerodynamic surface or structure during flight.

12. The aircraft according to claim 1, wherein the engine is positioned below the wing.

13. The aircraft according to claim 1, wherein the at least one fuel tank comprises a boundary layer ingesting propulsor mounted to an aft end of the at least one fuel tank.

14. The aircraft according to claim 1, wherein the at least one fuel tank is mounted to the wing via an engine pylon.

\* \* \* \* \*